June 21, 1949.   A. A. NELSON   2,473,722
MOLDING HOLLOW ARTICLES
Filed Sept. 29, 1945
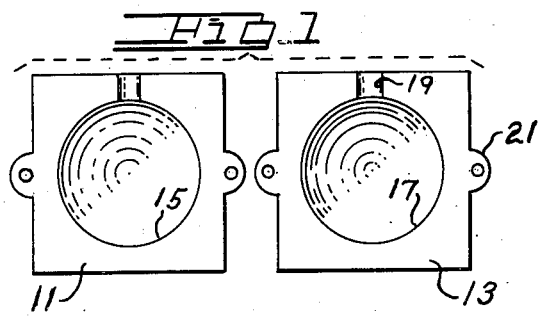
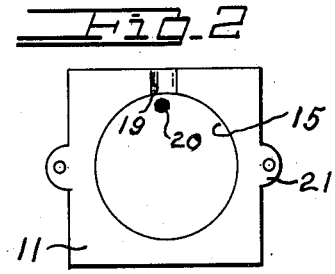
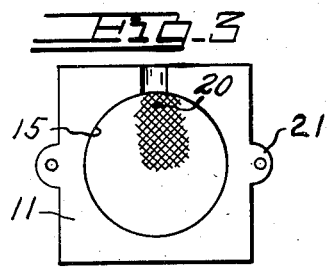
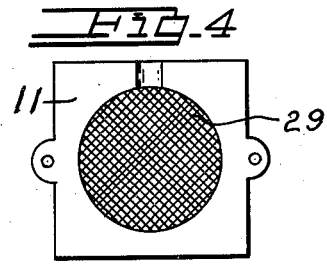
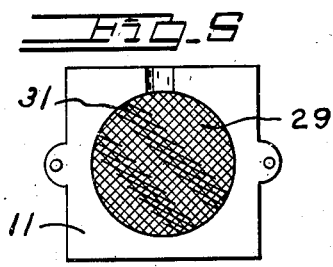
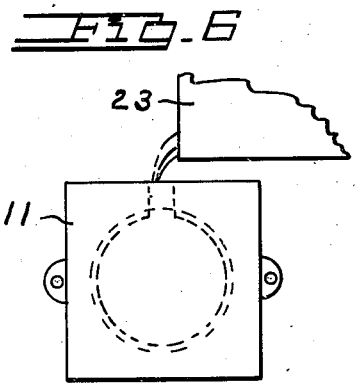
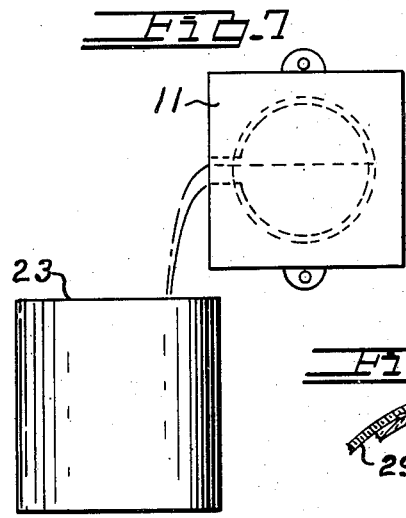
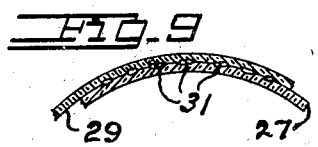
INVENTOR
Alex A. Nelson
BY F. F. Hicks
ATTORNEY Patented June 21, 1949

2,473,722

UNITED STATES PATENT OFFICE 2,473,722

MOLDING HOLLOW ARTICLES

Alex A. Nelson, Pleasant Ridge, Mich.

Application September 29, 1945, Serial No. 619,279

3 Claims. (Cl. 18—55)

My invention pertains to an improved process for molding hollow articles, more particularly to utilizing thermo plastic synthetic materials for making hollow flexible articles, to providing color pigment in such molded articles, and it also pertains to an improved product.

It is an object of my invention to provide an improved process for molding hollow flexible articles which will have the advantage of requiring a minimum of equipment for utilizing synthetic molding materials.

It is also an object of my invention to provide an improved method of utilizing color pigments to color such molded products.

It is a further object of my invention to provide an improved hollow flexible article having color pigment therein.

The invention itself, however, both as to the process and the product, together with additional objects and advantages thereof, will best be understood from the following description when read in conjunction with the accompanying drawings, in which:

Fig. 1 is an elevational view showing the two parts of a split mold for molding hollow articles;

Figs. 2, 3 and 4 are elevational views showing how the material is spread over inner surfaces of the mold;

Fig. 5 is an elevational view representing the application of color pigments to the coating previously formed on the inner surfaces of the mold;

Fig. 6 is an elevational view showing the two parts of the mold secured together for receiving thinned material poured thereinto;

Fig. 7 is an elevational view illustrating removal of the thinned material;

Fig. 8 is a side elevational view of the product; and

Fig. 9 is a sectional view on line 9—9 of Fig. 8 and greatly enlarged.

Referring more specifically to the figures of the drawing, it will be seen that I provide a split mold having two parts 11 and 13 between which are two recesses 15 and 17 adapted together to form a cavity in the shape of the article to be produced with a sprue passage 19 opening from the upper side walls of the mold. The recesses 15 and 17 in the mold may be made in simulation of the article to be reproduced by well known methods of copying and reproducing. For making a hollow flexible ball, each of the recesses 15 and 17 is simply hemi-spherical in shape, which is the example illustrated, although other products, such as dolls' heads and articles of other shapes can be made, as will be readily understood.

A molding material is utilized which has suitable physical properties such as flexibility and sufficient strength at normal temperatures and thinning and flowing properly at high temperatures. For this purpose various synthetic and/or plastic composition materials are adaptable, and especially those known as vinyl resins held in suspension in a plasticizer.

After providing a suitable split mold the steps of my process may be performed as follows:

1. Heat the mold to say about 150° F., or other hot temperature according to the material which is to be molded.

2. Take one part of the heated mold, and apply a gob or lump 20 of the molding material, which may be of a rather soft putty-like consistency, and place it in the upper portion of the cavity. If desired, some color pigment may be first applied on the mold.

3. As the heat of the mold thins the material it tends to flow more freely, and by means of a lubricated finger, or any suitable implement, it is spread out over the entire surface of the cavity forming a skin-like coating, perhaps about ⅛ inch thick. This is represented by the inclined shade lines in Figs. 3, 4 and 5.

4. The various desired color pigments are then applied, as by a lubricated finger or suitable implement, to represent the various colors, color irregularities, designs or ornamentation desired in the article. The color is represented at 31 by the added inclined shade lines in Fig. 5.

5. The other part of the heated mold, is then taken and treated as in above paragraphs 2, 3, and 4.

6. Put the two parts of the mold together fitting snugly in proper cooperative relation, cooperative lugs 21 may be provided on the two parts of the mold for receiving clamping bolts.

7. Take some of the same material in a suitable vessel 23 and thin it with a suitable vehicle or solvent.

8. Pour the thinned material into the mold through the sprue opening 19 and in a short time pour it out. A portion will remain coated as an inner coating or layer on the previously applied material and the remainder will pour out leaving a central cavity.

9. Place the mold into an oven and cure the material for a suitable time as a temperature proper for the material used.

10. Remove the formed article or ball 25 from the mold, cool in the air, and it is finished.

To provide molding material which is especially suitable for my process, I take as a base material either vinyl chloride, or vinylidene chloride, or vinyl chloracetate, and to either such base material I preferably add three plasticizers. These plasticizers are dioctyl, phthalate, dibutyl phthalate, and butyl phthalyl butyl glycollate. Although the proportions of these plasticizers may be varied, I have found that it is especially satisfactory to take equal portions of each.

These plasticizers are just mixed together with the base material by usual utensils and it is not necessary to have special apparatus.

As is well known, a plasticizer enters into the molecule of the resin and makes the resin flexible, and it is common practice to add a plasticizer for this purpose.

But I have found that the combination of these three plasticizers with any one of such base materials produces an improved molding material having properties which are especially advantageous for certain special work. Articles molded of any one of these three molding materials have improved permanence of size, color, and flexibility. Also where such molded articles are to be attached to other members, especially of synthetic materials, a chemical joint is made which is stronger and more permanent, if such molding materials are utilized. For such materials, I have found that for curing the molded article, as in step No. 9 above, temperatures between 250° and 350° F. for from 3 to 4 hours are suitable.

As may be seen in Fig. 9, an enlarged fragmentary sectional view, the finished hollow article 25 comprises an inner coating 27 an outer coating 29 and color pigment 31 entrapped between the two coatings.

Also the sprue opening 19 may be omitted from the mold, and the mold may be made up in two parts completely closed together if desired. With this arrangement, the steps designated as "7" and "8" above are omitted in performing the process, and color pigments are applied directly to the cavity surfaces of the mold. The colors may be applied according to some desired design and very intricate and ornamental designs or pictures may be applied, as by the use of transfers or decalcomanias.

The process is otherwise similar to the first process except that the molding material is spread over the cavity surfaces of the mold to make a coating of sufficient depth and thicker and projecting slightly around the edges. The two parts of the mold are then clamped together. The heat treatment is then applied in a suitable oven or source of heat, which cures the material and seals the two parts of the ball together as a completed article.

It is apparent that within the scope of my invention modifications and different arrangements may be made other than herein disclosed, and the present disclosure is illustrative merely, the invention comprehending variations thereof. Some additional uses and adaptations of my methods, are disclosed and claimed in my copending patent application Serial No. 626,791, filed November 5, 1945.

I claim:

1. The method of making hollow colored flexible articles which consists in, taking a split mold having cooperative cavities between the two parts of the mold in simulation of the article to be formed and providing a sprue passage opening from one side of the mold, heating the mold, spreading over the cavity surfaces of the mold a material of putty-like or semi-fluid consistency, applying color pigments upon the coating so formed, positioning the two parts of the mold snugly together with the cavities thereof in cooperative relation, pouring into the mold some of the material thinned with a suitable vehicle to form an inner coating, pouring out of the mold such thinned material as remains unattached subjecting the mold to heat for sealing together and curing the molded article, and opening apart the parts of the mold for removing the molded article.

2. The method of making hollow colored flexible articles which consists in, taking a split mold having cooperative cavities between the two parts of the mold, said cooperative cavities being formed in simulation of the article to be formed and providing a sprue passage opening from one side of the mold, heating the mold, spreading over the cavity surfaces of the mold a vinyl resin material held in suspension in a plasticizer, applying color pigments upon the coating so formed, positioning the two parts of the mold snugly together with the cavities thereof in cooperative relation, pouring into the mold some of the material thinned with a suitable vehicle to form an inner coating, pouring such thinned material as remains unattached out of the mold, subjecting the mold to heat for sealing together and curing the molded article, and opening the parts of the mold apart for removing the molded article.

3. The method of making a hollow article which consists in, taking a split mold having a plurality of parts which may be assembled together to cooperatively enclose a cavity in simulation of the article to be made and with a sprue aperture opening from the upper portion, heating the parts of the mold, spreading a vinyl resin and coloring material as a coating over the cavity surfaces as such materials are softened by the heat from the mold parts, positioning the parts of the mold snugly together with the cavity surfaces in cooperative relation, pouring in a quantity of material which has been suitably thinned to pour as a liquid for forming an inner coating, pouring out of the mold the unattached portion of such thinned material, subjecting the mold to heat for sealing together and curing the molded article, and opening the parts of the mold apart for removing the formed article.

ALEX A. NELSON.

REFERENCES CITED

The following references are of record in the file of this patent:

UNITED STATES PATENTS

| Number | Name | Date |
| --- | --- | --- |
| 283,795 | Lockwood | Aug. 28, 1883 |
| 976,359 | Hamel | Nov. 22, 1910 |
| 1,394,553 | Hoffer | Oct. 25, 1921 |
| 1,666,099 | Kingman | Apr. 17, 1928 |
| 1,703,348 | Malin | Feb. 26, 1929 |
| 1,876,432 | Phillips | Sept. 6, 1932 |
| 1,896,123 | Schweitzer | Feb. 7, 1933 |
| 1,918,383 | Czapek et al. | July 18, 1933 |
| 1,949,502 | Szegvari | Mar. 6, 1934 |
| 2,028,808 | Rosenthal | Jan. 28, 1936 |
| 2,230,192 | Ross et al. | Jan. 28, 1941 |
| 2,294,071 | Carter | Aug. 25, 1942 |
| 2,324,974 | Greenup | July 20, 1943 |

Certificate of Correction

Patent No. 2,473,722 — June 21, 1949

ALEX A. NELSON

It is hereby certified that errors appear in the printed specification of the above numbered patent requiring correction as follows:

Column 2, line 50, for the word "as" read *at*; column 3, line 4, after "dioctyl" strike out the comma; column 4, line 8, claim 1, after "unattached" insert a comma; and that the said Letters Patent should be read with these corrections therein that the same may conform to the record of the case in the Patent Office.

Signed and sealed this 13th day of December, A. D. 1949.

[SEAL]

THOMAS F. MURPHY,
*Assistant Commissioner of Patents.*